(12) United States Patent
Kuo

(10) Patent No.: US 11,244,222 B2
(45) Date of Patent: Feb. 8, 2022

(54) ARTIFICIAL INTELLIGENCE-ENABLED DEVICE FOR NETWORK CONNECTIVITY INDEPENDENT DELIVERY OF CONSUMABLE INFORMATION

(71) Applicant: SONY CORPORATION, Tokyo (JP)

(72) Inventor: Jenke Wu Kuo, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 865 days.

(21) Appl. No.: 16/020,210

(22) Filed: Jun. 27, 2018

(65) Prior Publication Data
US 2020/0005116 A1    Jan. 2, 2020

(51) Int. Cl.
| | |
|---|---|
| G06N 5/04 | (2006.01) |
| G06Q 10/04 | (2012.01) |
| G06F 9/50 | (2006.01) |
| G06K 9/62 | (2006.01) |
| G06F 9/455 | (2018.01) |
| G06N 3/00 | (2006.01) |
| G06N 3/04 | (2006.01) |
| G06N 3/08 | (2006.01) |
| H04W 84/18 | (2009.01) |
| H04W 84/12 | (2009.01) |

(52) U.S. Cl.
CPC ............... *G06N 3/006* (2013.01); *G06N 3/04* (2013.01); *G06N 3/08* (2013.01); *H04W 84/12* (2013.01); *H04W 84/18* (2013.01)

(58) Field of Classification Search
CPC ............ G06N 3/006; G06N 3/08; G06N 3/04; G06N 20/00; H04W 84/12; H04W 84/18; H04L 67/2842

USPC ........................................................ 706/1–62
See application file for complete search history.

(56) References Cited

U.S. PATENT DOCUMENTS

| | | | |
|---|---|---|---|
| 7,814,483 B2 | 10/2010 | Li et al. | |
| 8,365,203 B2 | 1/2013 | Wong et al. | |
| 9,036,509 B1 * | 5/2015 | Addepalli | H04L 51/02 370/259 |
| 9,432,373 B2 | 8/2016 | Ryder | |

(Continued)

OTHER PUBLICATIONS

Han H., et al., (2011) "Cashing in on the Cache in the Cloud" Retrieved from https://ieeexplore.ieee.org/abstract/document/6095538 (Year: 2011).*

*Primary Examiner* — Brandon S Cole
(74) *Attorney, Agent, or Firm* — Chip Law Group

(57) ABSTRACT

An artificial intelligence-enabled device that handles delivery of user consumable information independent of network connectivity of the AI-enabled device, includes a memory and neural circuitry. The neural circuitry allocates a dedicated cache storage and determines a type of intelligent service on the AI-enabled device, for which first information is to be cached at the dedicated cache storage. The neural circuitry caches first information from a cloud server to a local sub-cache in the dedicated cache storage. The first information of the determined type of service is adaptively cached during at least one of a background activity or a foreground activity of the AI-enabled device, in accordance with an offline state or an online state of the AI-enabled device. The neural circuitry further controls delivery of user consumable information, based on a user input, on the AI-enabled device, based on the local sub-cache and supplemental information retrievable from the cloud server.

20 Claims, 7 Drawing Sheets

(56) References Cited

U.S. PATENT DOCUMENTS

| | | | |
|---|---|---|---|
| 2013/0066936 A1 | 3/2013 | Krishnan et al. | |
| 2014/0075319 A1* | 3/2014 | Kuo | G06F 9/5055 |
| | | | 715/736 |
| 2015/0339572 A1* | 11/2015 | Achin | G06N 5/04 |
| | | | 706/46 |
| 2018/0046926 A1* | 2/2018 | Achin | G06Q 10/04 |
| 2019/0095786 A1* | 3/2019 | Carbune | G06Q 30/0202 |
| 2021/0133123 A1* | 5/2021 | Feehrer | G06F 13/1652 |

\* cited by examiner

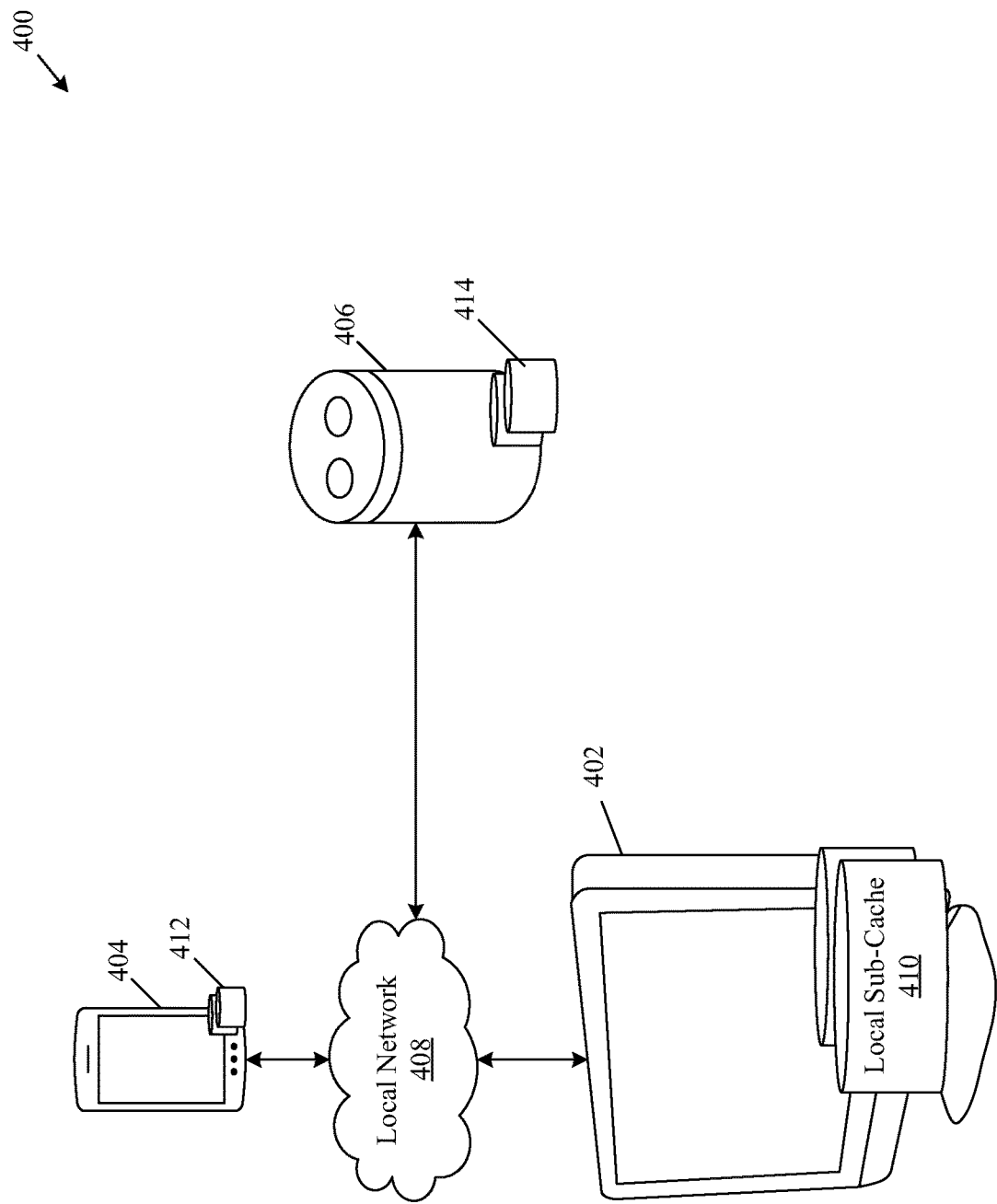

ARTIFICIAL INTELLIGENCE-ENABLED DEVICE FOR NETWORK CONNECTIVITY INDEPENDENT DELIVERY OF CONSUMABLE INFORMATION

CROSS-REFERENCE TO RELATED APPLICATIONS/INCORPORATION BY REFERENCE

None.

FIELD

Various embodiments of the disclosure relate to on-device data caching based on machine learning technologies. More specifically, various embodiments of the disclosure relate to an Artificial Intelligence (AI)-enabled device and method for delivery of user consumable information independent of network connectivity.

BACKGROUND

Recent advancements in AI technologies and different consumer electronic devices have paved a way to access various cloud-enabled services on different consumer electronic devices, for example, a television (TV). Also, recent developments in different technologies, such as speech recognition, natural language processing, and machine learning, have made it possible to use different applications that deliver different types of actionable information (e.g., notifications) to users through smart phones, smart TVs, smart cars, and other devices. Typically, to deliver actionable information through different devices, such applications have to serve a request and retrieve data from different cloud servers, every time the devices are connected to a network (e.g., internet). The actionable information is usually present or derived from the data that is retrieved from different cloud servers. However, to generate the actionable information or to extract the actionable information from the retrieved data, the devices have to be connected to an online network at the time of delivery of the actionable information. Consequently, there is a dependency to access cloud data for every user request, which in turn delays a time for delivery of the actionable information on such devices. For example, different services may clog the network for a certain duration when the devices connect to the online network or in certain scenarios, online connectivity may not be consistently available. As a result, the response time, e.g., a total time between the time of reception of a user's request to the time of delivery of different actionable information, increases because the applications have to wait for certain time required to download the data from the cloud server.

Further limitations and disadvantages of conventional and traditional approaches will become apparent to one skilled in the art, through comparison of described systems with some aspects of the present disclosure, as set forth in the remainder of the present application and with reference to the drawings.

SUMMARY

An Artificial Intelligence (AI)-enabled device and method are provided for delivery of user consumable information independent of a network connectivity, as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 4 illustrates an exemplary scenario of a local network environment for the AI-enabled device of FIG. 2 and a plurality of secondary devices, where the AI-enabled device acts as an access point for the plurality of secondary devices, in accordance with an embodiment of the disclosure.

DETAILED DESCRIPTION

Certain embodiments of the disclosure may be found in an Artificial Intelligence (AI)-enabled device that handles delivery of user consumable information independent of network connectivity of the AI-enabled device (e.g., a smartphone, a smart TV, etc.). The AI-enabled device may implement an AI learning model that is trained periodically (i.e. regularly) on user preferences, network connectivity information of the AI-enabled device, usage information of intelligent services (e.g., a program recommendation service on a smart TV), and usage information of the AI-enabled device. The trained AI learning model may be used to identify requirements of cloud data for a type of intelligent service on the AI-enabled device. Further, the trained AI learning model may be used to adaptively cache cloud data from the cloud server, to a local sub-cache in the dedicated cache storage of the AI-enabled device. In accordance with an embodiment, the AI-enabled device may adaptively cache the cloud information during a background activity or a foreground activity of the AI-enabled device, in accordance with an offline state or an online state of the AI-enabled device.

The AI-enabled device enables delivery of user consumable information, based on the adaptively cached cloud data in the local sub-cache, with a maximum dependency on the local sub-cache and a minimum dependency on the supplemental information that may be retrieved from the cloud server at the time of delivery of user-consumable information. In some cases, the user consumable information may be delivered with a maximum dependency on the local sub-cache and a zero dependency on the supplemental information in the offline state (e.g., an offline network connection status on the AI-enabled device). The maximum dependency on the local sub-cache may further minimize a response time between a request to deliver the user consumable information and a delivery time of the user consumable information at the AI-enabled device. In contrast, conventional solutions deliver user consumable information on a conventional client device (e.g., a smart TV or a smartphone) by downloading cloud data every time the conventional client device connects to a network (e.g. internet). Different conventional services (e.g., maps, music, navigation, etc.) clog a network bandwidth that is available on the conventional device and therefore, the clogged network bandwidth increases a response time between a user request and delivery of user consumable information on the conventional client device.

Figure 1:
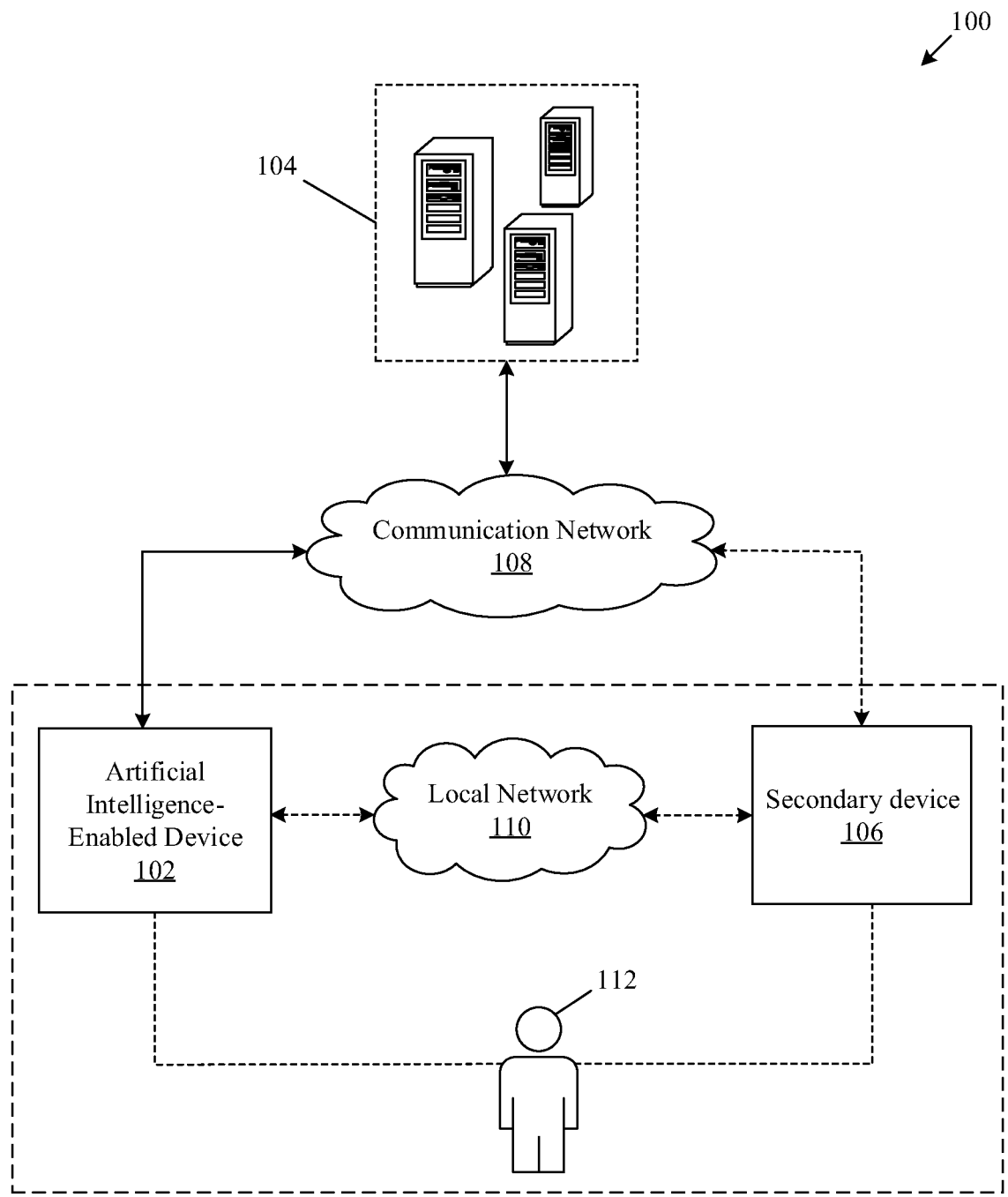
FIG. 1 illustrates a network environment, where user consumable information is delivered independent of network connectivity, in accordance with an embodiment of the disclosure.

FIG. 1 illustrates a network environment, where user consumable information is delivered independent of network connectivity, in accordance with an embodiment of the disclosure. With reference to FIG. 1, there is shown a network environment 100. The network environment 100 includes an artificial intelligence (AI)-enabled device 102, a cloud server 104, and a secondary device 106. The AI-enabled device 102 may be communicatively coupled to the cloud server 104, via the communication network 108. There is further shown a local network 110. The AI-enabled device 102 may be communicatively coupled to the secondary device 106, via the local network 110. There is further shown a user 112, who is associated with the AI-enabled device 102 and the secondary device 106.

The AI-enabled device 102 may comprise suitable logic, circuitry, and interfaces that may be configured to deliver user consumable information independent of network connectivity. The AI-enabled device 102 may cache information associated with a type of service determined by the AI-enabled device 102. In accordance with an embodiment, the AI-enabled device 102 may cache the information from the cloud server 104 to a dedicated cache storage in the AI-enabled device 102. Examples of the AI-enabled device 102 may include, but are not limited to, televisions (e.g., smart TVs or ATSC TVs), digital media players, digital cameras, gaming consoles, smartphones, laptops, desktop computers, printers, smart speakers, and smart wearable electronics. In some embodiments, the AI-enabled device 102 may be a smart home appliance, such as a smart refrigerator, a smart washing machine, and smart air conditioners. The AI-enabled device 102 may communicate with other AI-enabled or non-AI devices, such as the secondary device 106, via a communication network 108.

The cloud server 104 may comprise suitable logic, circuitry, and interfaces that may be configured to transmit supplemental information (e.g., a real time hyper local weather data for a personalized travel update on AI-enabled device 102) to the AI-enabled device 102, in response to requests received from the AI-enabled device 102. The request may be at least one of a user request, a device request, a request automatically initiated by one or more intelligent services on the AI-enabled device 102, or a request intermediated by a functional service on the cloud server 104 on behalf of the AI-enabled device 102. In accordance with an embodiment, the cloud server 104 may interact through functional services (not shown in the figure) to generate and transmit additional data or service information, as requested, to the AI-enabled device 102. The type of service that is functional on the AI-enabled device 102 (or the type of information that is requested by the AI-enabled device 102) may define a type of cloud service (functional service) offered by the cloud server 104. The cloud server 104 may be configured to operate in a service-oriented architecture. The service-oriented architecture may define a service model, for example, an Infrastructure-as-a service (IAAS), a platform-as-a-service (PAAS), a software-as-a-service (SAAS), and the like.

The secondary device 106 may comprise suitable logic, circuitry, and interfaces that may be configured to receive local sub-cache(s) distributed from the AI-enabled device 102, via the communication network 108 or the local network 110. The received local sub-cache may be stored at a local storage on the secondary device 106. In accordance with an embodiment, the secondary device 106 may receive a local training model (e.g., a trained, a partially trained, or an untrained learning model), generated at the AI-enabled device 102, from the local storage of the AI-enabled device 102. The secondary device 106 may be a personal device that is accessible to a user (e.g., the user 112) of the AI-enabled device 102. In certain cases, the secondary device 106 may be a device (e.g., a smart TV, a smart speaker, etc.) that is part of a home network of devices. Such home network of devices may also include the AI-enabled device 102 along with other devices, such as home security devices, entertainment devices, and home automation devices (e.g., smart lights, smart switches, etc.). Examples of the secondary devices 106 may include, but are not limited to, a smart phone, a smart TV, wearable's like a smart watch, Virtual Reality/Augmented Reality/Mixed Reality (AR/VR/MR) headsets, and smart speakers (enabled with smart conversation agents).

The communication network 108 may comprise suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 108 may include a medium through which the AI-enabled device 102, and/or the cloud server 104 may communicate with each other. The communication network 108 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the communication network 108 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of a bandwidth criteria. For example, an optical fiber channel may be used for a high bandwidth communication. Further, a coaxial cable-based or Ethernet-based communication channel may be used for moderate bandwidth communication.

The local network 110 may include a medium through which the AI-enabled device 102, and/or the secondary device 106 may communicate with each other. The local network 110 may be a wired or wireless communication network. In accordance with an embodiment, the AI-enabled device 102 may act as an access point for the secondary device 106, via the local network 110. The local network 110 may include, but is not limited to, a Local Area Network (LAN), a Wireless Local Area Network (WLAN), a wireless home network (WHN), a wireless local area network (WLAN), or a wireless ad hoc network (WANET), a $2^{nd}$ Generation (2G), a $3^{rd}$ Generation (3G), a $4^{th}$ Generation (4G) cellular, or a combination thereof. Various devices in the network environment 100 may be configured to connect to the local network 110, in accordance with various wired and wireless communication protocols. Examples of such wired and wireless communication protocols may include, but are not limited to, TCP/IP, UDP, HTTP, File Transfer Protocol FTP, Zig Bee, EDGE, infrared (IR), IEEE 802.11, 802.16, cellular communication protocols, and/or Bluetooth (BT) communication protocols.

In operation, a plurality of intelligent services (e.g., an intelligent travel suggestion service based on hyper local weather information and a calendar schedule of a user) may be operational on the AI-enabled device 102. At least one of the plurality of intelligent services may utilize the computational resources of the AI-enabled device 102, to generate and deliver consumable information (e.g., status updates, notifications, audio-video updates, personalized information etc.) to a user. The user consumable information may be personalized information that is delivered on the AI-enabled device 102, or other secondary devices associated with the AI-enabled device 102. The user consumable information may include, but are not limited to, audio content, video content, text content, image, graphics, audio-visual notifications, actionable insights, user selectable options, guidance information, visual information, audio-visual recommendations, or a combination thereof.

Each intelligent service of the plurality of intelligent services may be a service handled by the AI-enabled device 102 using an AI learning model locally stored and updated at the AI-enabled device 102. Different services may be provided by one or more applications pre-installed in the AI-enabled device 102. To provide different services, the one or more applications may retrieve data from one or more cloud-based resources, and generate certain output based on the processing of the retrieved data. Each intelligent service may be a service that interacts with the one or more applications to manage or modify data retrieval, caching, and other operations, using the local AI learning model. In accordance with an embodiment, each intelligent service of the plurality of intelligent services may be a service that generates a new, an inferred, or an insightful output (not existing previously) using AI learning model of the AI-enabled device 102 and sample data, such as user preferences, network connectivity information of the AI-enabled device 102, usage information of the plurality of intelligent services or the AI-enabled device 102. Examples of the plurality of intelligent services may include, but are not limited to, an offline voice input processing service or a personalized device control and recommendation service.

In order to generate and deliver the consumable information, the AI-enabled device 102 may be configured to store instructions associated with the plurality of intelligent services that operates on the AI-enabled device 102. Also, the AI-enabled device 102 may be configured to store training data to train a local AI learning model. The training data may include a set of user preferences, network connectivity information of the AI-enabled device 102, and first usage information of the plurality of intelligent services. In certain cases, second usage information (e.g., device usage footprints, such as time interval for which the AI-enabled device 102 may be accessed by a user) of the AI-enabled device 102.

The set of user preferences may include historical preferences for different services (e.g., music, TV, weather, maps, location, etc.) availed on the AI-enabled device 102 or the secondary device 106, and preferences that are collected or inferred based on real time user activities on the AI-enabled device 102. As an example, the set of user preferences may include, but are not limited to, a type of music, a genre, a musician, a preferred artist, a preferred food type, a user traveling time, a list of programs watched on the AI-enabled device 102 or the secondary device 106. Such preferences may be collected, retrieved from logs (e.g., application logs, device activity logs, etc.) or inferred (or generated) based on different user activities and user inputs (e.g., user footprints based on textual inputs, searched keywords, voice inputs, touch inputs, etc.) on different intelligent/non-intelligent applications on the AI-enabled device 102. An application may be classified as a non-intelligent application when one or more operational components of the non-intelligent application execute different instructions on the AI-enabled device 102, without a dependence on an AI learning model locally stored and updated on the AI-enabled device 102. As an example, services on an AI-enabled smartphone that don't have a need to cache information from the cloud server 104 to deliver consumable information on the AI-enabled device 102 or other secondary devices.

The network connectivity information of the AI-enabled device 102 may include, but is not limited to, a bandwidth of the network (between the AI-enabled device 102 and the cloud server 104), a type of network, a duration for which the AI-enabled device 102 accesses the network. The first usage information of the plurality of intelligent services may include, but is not limited to, a type of information specified in a user request to the intelligent service, a time-based usage footprints, and a usage pattern of different functional services on the cloud server 104 (e.g., how is the weather information or navigation information used by a user during driving). Similarly, the second usage information of the AI-enabled device 102 may include, but are not limited to, a user active duration on the AI-enabled device 102, usage logs of different types of AI applications and non-AI applications on the AI-enabled device 102, a usage pattern associated with the AI-enabled device 102 (e.g., how a call may be made to interact with different APIs of functional services at the cloud server 104).

Each intelligent service, operational on the AI-enabled device 102, may be managed by a local application on the AI-enabled device 102, a functional service on the cloud server 104 (e.g., a cloud server dedicated for a type of intelligent service), or a combination thereof. A functional service may be a cloud service that manages the requirements (e.g. data required for an intelligent service) and one or more operations of the intelligent services on the AI-enabled device 102. In some cases, the intelligent service may be a self-managed service that is operational on the AI-enabled device 102. Each of such intelligent services may manage the local AI learning model on the AI-enabled device 102. The local AI learning model may be a service-specific (or a service-independent) machine learning model developed, managed, trained, and utilized on the AI-enabled device 102 (and/or the secondary device 106).

The local AI learning model may be generated by the AI-enabled device 102 in a local storage (e.g., a dedicated memory) of the AI-enabled device 102. The generation of the local AI learning model may correspond to the training of the local AI learning model on training data that may be pre-stored and/or collected on the AI-enabled device 102, or additional data retrieved from the cloud server 104. In some embodiments, the training of the local AI learning model may be accelerated based on an AI accelerator circuitry (e.g., an AI accelerator application-specific integrated circuit (ASIC)). The AI accelerator circuitry may be an on-device (offline) AI accelerator circuitry (not shown in FIG. 1) or a server-end (online) AI accelerator circuitry (i.e., available on the cloud server 104). The learning rate and learning errors of the local AI learning model may be further optimized based on specific learning optimization models, for example, heuristic or meta-heuristic optimization models, or non-heuristic models, such as Adagrad, Adadelta, Adamax, momentum, AMSgrad, etc.

The AI-enabled device 102 may include a cache storage that may store cache data for a certain type of intelligent service or different types of intelligent services. The cached storage may be a dedicated cache storage that may be allocated by the AI-enabled device 102 for one or more of the plurality of intelligent services. The AI-enabled device 102 may be further configured to determine a type of service (e.g., a calendar schedule service, a navigation service, a movie recommendation service, etc.) associated with at least one of the plurality of intelligent services, information for which is to be cached at the dedicated cache storage. The type of service may be a service that is required to be accessed from the cloud-based resource to retrieve first information (i.e. information that is to be cached at the dedicated cache storage. For example, if location information from an area is required to be cached, then the type of service may be a map service.

The AI-enabled device 102 may be further configured to cache first information (e.g., a TV program schedule, weather data, etc.), associated with the determined type of service from the cloud server 104, to a local sub-cache in the dedicated cache storage the AI-enabled device 102. In accordance with an embodiment, the first information may be cached based on a mapping of the determined type of service to a corresponding functional service on the cloud server 104. In accordance with an embodiment, the first information associated with the determined type of service may be adaptively cached during at least one of a background activity or a foreground activity of the AI-enabled device 102. Also, the first information may be cached in accordance with an offline state or an online state of the AI-enabled device 102. The online state or the offline state may be specified in the network connectivity information stored on the AI-enabled device 102. The cached first information may be downloaded and updated periodically from the cloud server 104, via the communication network 108. The online state of the AI-enabled device 102 may correspond to a network state where the AI-enabled device 102 may access the cloud server 104, via the communication network 108. The offline state of the AI-enabled device 102 may correspond to a network state where the AI-enabled device 102 may not be accessible to the cloud server 104, for example, a network state that indicates that the AI-enabled device 102 is disconnected from an internet access point.

The AI-enabled device 102 may be configured to control delivery of user consumable information, associated with at least one of the plurality of intelligent services, on the AI-enabled device 102. Such controlled delivery of the user consumable information may be done based on at least one of the local sub-cache and supplemental information retrievable from the cloud server 104. The supplemental information may include additional information that is required to be accessed in real time or near real time for delivery of consumable information in a case where previously cached information may be insufficient or irrelevant to generate the user consumable information. As an example, a smart travel stay recommendation service may need current route of the user's vehicle to generate and deliver travel stay recommendations. The user consumable information may be delivered with a maximum dependency on the local sub-cache and a minimum dependency on the supplemental information. In certain embodiments, the user consumable information may be delivered with a zero dependency on the supplemental information. Alternatively stated, the AI-enabled device 102 may be configured to deliver the user consumable information only based on data stored in the local sub-cache or other on-device information on the AI-enabled device 102. In some cases, the maximum dependency on the generated local sub-cache may further minimize a response time between a request to deliver the user consumable information onto the AI-enabled device 102 and a delivery time of the user consumable information onto the AI-enabled device 102.

In some embodiments, the user consumable information may be delivered onto the AI-enabled device 102 based on a user input. The user input may be received via an input device. The input device may be an embedded input device within the AI-enabled device 102, an externally coupled input to the AI-enabled device 102 or the secondary device 106, or other network interfaced or coupled input devices. Examples of the input device may input device may include, but are not limited to, a touchscreen, a microphone, a keyboard, a mouse, a joystick, a haptic input, a gesture input device, a motion sensor, a game controller, a remote (a non-TV remote), and a smart TV remote. In other embodiments, the user consumable information may be delivered based on a request received from at least one of the AI-enabled device 102 or the cloud server 104. The request may be at least one of a device request, a request initiated by the at least one intelligent service, or a functional service on the cloud server 104.

In some embodiments, the complexity of operations executed on the AI-enabled device 102 to deliver the user consumable information (e.g., intelligent recommendations, notifications, etc.) may depend on various factors, such as a size of the training data, an operational complexity of an intelligent service, a computational complexity, a training time for the local AI learning model, and the like. Therefore, in such embodiments, some of the functional information, pre-trained models, or other service-oriented data may be pre-cached, from the cloud server 104, on the AI-enabled device 102. The AI-enabled device 102 may be updated with the user consumable information independent of network connectivity and within an optimal response time.

As shown in FIG. 1, the network environment 100 illustrates a specific network architecture through which the user consumable information is delivered onto the AI-enabled device 102. However, the specified network architecture (in FIG. 1) may have different configurations and other network components to achieve the same functional performance and output, without a deviation from the scope of present disclosure. For example, the delivery of user consumable information may be controlled by one AI-enabled device (e.g., the AI-enabled device 102) or a distributed network of AI-enabled devices. Also, instead of a single AI-enabled device, there may be a plurality of AI-enabled devices and a plurality of the secondary devices engaged in communication with one or more of a plurality of the cloud servers in the network environment 100.

In an exemplary embodiment, the AI-enabled device 102 may be a smart TV and the AI-enabled device 102 may extract information of recommended videos for a user (e.g., the user 112) based on the functional services used by the user (e.g., the user 112) in the past. In accordance with an embodiment, the AI-enabled device 102 may interact with functional services on the cloud server 104 via Application Program Interfaces (APIs) to perform functions related to intelligent services. Such intelligent services may be, for example, switch on the TV, set an event on a calendar application, make a telephone call, directions to a destination address, and the like. Such functions may be performed by the AI-enabled device 102 after receiving the user input.

Figure 2:
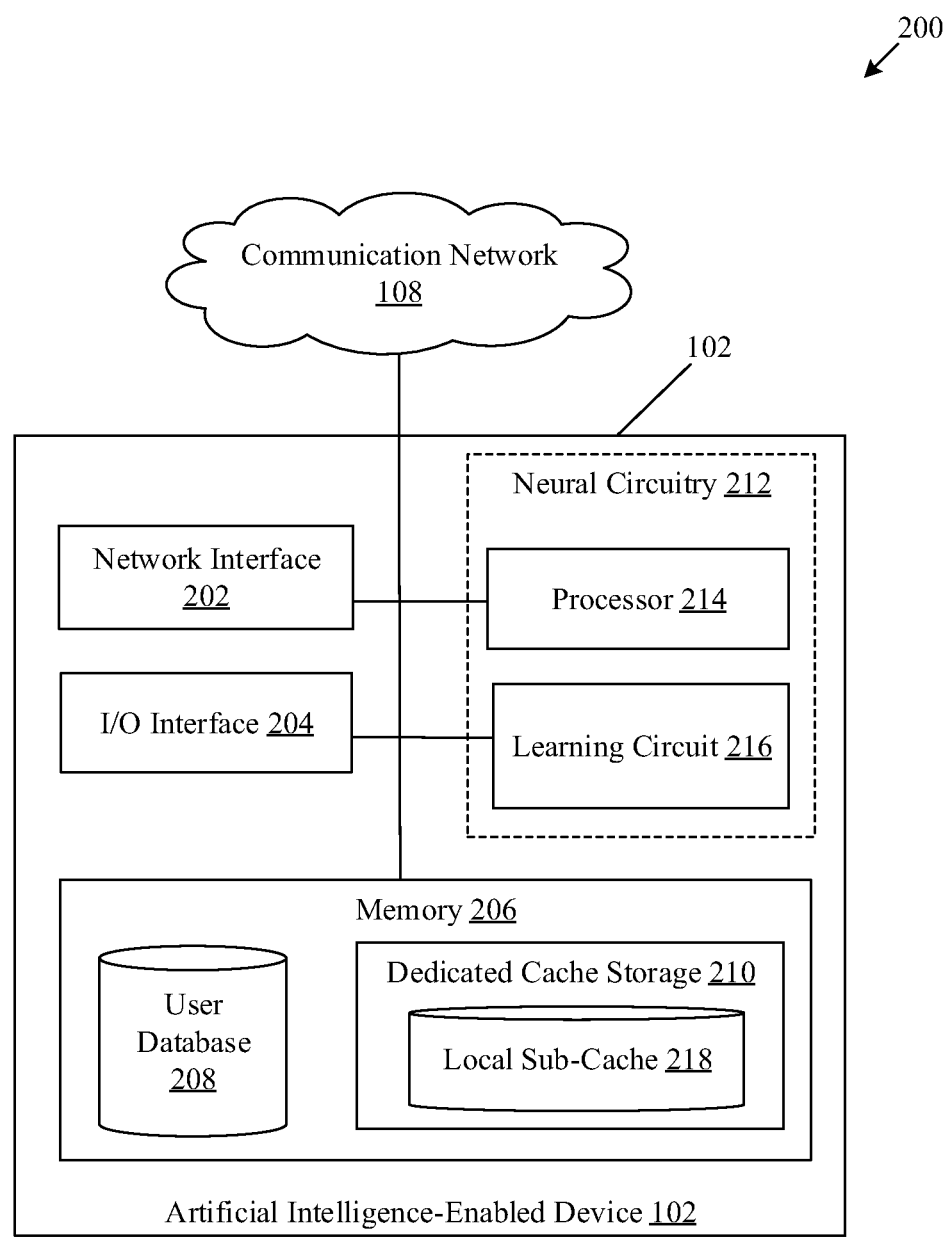
FIG. 2 illustrates a block diagram of an exemplary artificial intelligence (AI)-enabled device for delivery of user consumable information independent of network connectivity, in accordance with an embodiment of the disclosure.

FIG. 2 illustrates a block diagram of an exemplary AI-enabled device for delivery of user consumable information independent of network connectivity, in accordance with an embodiment of the disclosure. FIG. 2 is explained in conjunction with elements from FIG. 1. With reference to FIG. 2, there is shown a block diagram 200 of the AI-enabled device 102. The AI-enabled device 102 may include one or more circuits, such as a network interface 202, an input/output (I/O) interface 204, a memory 206. The memory 206 may include a user database 208, a dedicated cache storage 210, and a local sub-cache 218 in the dedicated cache storage 210. There is also shown neural circuitry 212 that may include a processor 214 and a learning circuit 216.

The network interface 202 may comprise suitable logic, circuitry, and interfaces that may be configured to communicate with other systems and devices in the network environment 100, via the communication network 108 or and the local network 110. The network interface 202 may be implemented by use of known technologies to support wired or wireless communication of the AI-enabled device 102 with the communication network 108 and the local network 110. Components of the network interface 202 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 204 may comprise suitable logic, circuitry, and interfaces that may be configured to operate as an I/O channel/interface between a user (e.g., the user 112) and different operational components of the AI-enabled device 102 or other secondary devices (e.g., the secondary device 106). The I/O interface 204 may facilitate an I/O device (for example, an I/O console) to receive an input from a user (e.g., the user 112) and present an output based on the received input from the user. The I/O interface 204 may include various input and output ports to connect various I/O devices that may communicate with different operational components of the AI-enabled device 102. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices.

The memory 206 may comprise suitable logic, circuitry, and/or interfaces that may be configured to store a machine code and/or instructions executable by the neural circuitry 212 and the processor 214. The memory 206 may include the user database 208 and the dedicated cache storage 210. The dedicated cache storage 210 may further include the local sub-cache 218. The user database 208 may be configured to store instructions associated with a plurality of intelligent services that operates in the AI-enabled device 102, a set of user preferences, network connectivity information of the AI-enabled device 102, first usage information of the plurality of intelligent services, and second usage information of the AI-enabled device 102. The dedicated cache storage 210 of the memory 206 may store first information, associated with a type of service, cached from the cloud server 104 to the local sub-cache 218. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The neural circuitry 212 may comprise suitable logic, circuitry, and interfaces that may be configured to handle operations of the plurality of intelligent services on the AI-enabled device 102. The neural circuitry 212 may be configured to be trained on sample data, such as the set of user preferences, the network connectivity information of the AI-enabled device 102, the first usage information of the plurality of intelligent services, and the second usage information of the AI-enabled device 102 stored in the user database 208. Further, the neural circuitry 212 may include multiple network layers, where each layer constantly adjusts its weights while learning and fires thresholds until the output of its final layer consistently represents a solution for a requested intelligent service. The neural circuitry 212 may include the processor 214 and the learning circuit 216.

The processor 214 may comprise suitable logic, circuitry, and interfaces that may be configured to execute instructions stored in the memory 206. Examples of the processor 214 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The learning circuit 216 may comprise suitable logic, circuitry, and interfaces that may be configured to generate a local AI learning model associated with the AI-enabled device 102. In accordance with an embodiment, the local AI learning model may be generated based on the set of user preferences, the network connectivity information of the AI-enabled device 102, and the first usage information of the plurality of intelligent services. The learning circuit 216 may be implemented based on a number of processor technologies known in the art. The learning circuit 216 may be implemented based on a machine learning model, a deep learning model, such as a recurrent neural network (RNN), a convolutional neural network (CNN), and a feed-forward neural network, or a Bayesian model. The neural circuitry 212 may be communicatively coupled to the network interface 202, the I/O interface 204, and the memory 206. The network interface 202 may communicate with the one or more cloud servers, such as the cloud server 104, via the communication network 108 under the control of the neural circuitry 212.

In operation, a request may be received by the AI-enabled device 102, via the network interface 202. The request may be a user request, which may include user preferences, event information (e.g., weather information), or a user input that may indicate a user preference associated with a type of intelligent service (e.g., travel update based on weather information) available on the AI-enabled device 102. In some embodiments, the request may be at least one of a device request, a request initiated by an intelligent service, or a functional service on the cloud server 104. For example, the user request may include a voice input, which may indicate a user request, such as "What is the weather today?" The voice input may be received through the I/O interface 204 of the AI-enabled device 102. The neural circuitry 212 may be configured to determine the semantic expressions of the user (e.g., the user 112) from voice input and thereafter, the AI-enabled device 102 may call (an API call) a functional service of the cloud server 104 to interface with the weather forecast application on the AI-enabled device 102. The functional service may be a cloud service that manages the requirements and one or more operations of the intelligent services via communications with the intelligent services on the AI-enabled device 102. As an example, a map server may have a functional service, such as a location API service, that manages location-related requirements of the intelligent service on the AI-enabled device 102.

The memory 206 may be configured to store, in the user database 208, the instructions (associated with the plurality of intelligent services that operates in the AI-enabled device 102), a set of user preferences, network connectivity information of the AI-enabled device 102, the first usage information of the plurality of intelligent services, and the second usage information of the AI-enabled device 102. The neural circuitry 212 may handle operations of the plurality of intelligent services. The processor 214 of the neural circuitry 212 may allocate the dedicated cache storage 210 for the plurality of intelligent services.

In accordance with an embodiment, the learning circuit 216 may be configured to train an adaptive machine learning model on the set of user preferences, the network connectivity information, the first usage information of the plurality of intelligent services, and the second usage information of the AI-enabled device 102 stored in the user database 208. The learning circuit 216 may be further configured to generate a local AI learning model based on the trained adaptive machine learning model. The local AI learning model may be generated further based on the set of user preferences, the network connectivity information of the AI-enabled device 102, and the first usage information of the plurality of intelligent services. In certain embodiments, the local AI learning model is generated based on at least one of a machine learning model, a deep learning model, or a Bayesian model. In accordance with an embodiment, the learning circuit 216 may be further configured to update the local AI learning model based on a real time or a near-real time change in user activity on the AI-enabled device 102. The local AI learning model may be further updated based on variations in network connectivity information (e.g., network bandwidth, available data rates, etc.), network connection status, device states (e.g., device usage logs), or other information associated with the AI-enabled device 102. In accordance with an embodiment, the set of user preferences, the first usage information, and the second usage information may selectively change with a change in the user activity.

The processor 214 may be configured to determine a type of service associated with at least one of the plurality of intelligent services, for which first information is to be cached at the dedicated cache storage 210, based on the generated local AI learning model and the second usage information of the AI-enabled device 102. The processor 214 may be further configured to cache the first information associated with the determined type of service, from the cloud server 104, to the local sub-cache 218 in the dedicated cache storage 210 of the memory 206. The first information associated with the determined type of service may be adaptively cached during at least one of a background activity or a foreground activity of the AI-enabled device 102. Also, the adaptive caching may be done in accordance with an offline state or an online state (specified in the network connectivity information) of the AI-enabled device 102. In accordance with an embodiment, the first information may be cached based on a mapping of the determined type of service to a corresponding functional service on the cloud server 104.

For example, for an intelligent service that provides a suggestion for a user (e.g., the user 112) to switch "ON" a smart TV at a specific time on a given day, the first information may include detailed programming schedule of different programs that may be preferred by the user (e.g., the user 112) and aired on the same day. Also, in some cases, the first information may include graphics, tags, audio, or other information associated with the detailed programming schedule of different programs. The processor 214 may further implement the local AI learning model that is previously trained on the user preferences, to generate a notification only on the basis of the first information in the local sub-cache 218 and other information stored on the AI-enabled device 102.

The processor 214 may be configured to generate user consumable information in accordance with a request received from a user, the AI-enabled device 102, or the cloud server 104. The user consumable information may be generated based on at least one of the generated local sub-cache 218 or supplemental information retrievable from the cloud server 104 The supplemental information may include additional information that is required to be accessed in real time or near real time for delivery of consumable information in a case where previously cached information may be insufficient or irrelevant to generate the user consumable information. As an example, a smart travel stay recommendation service may need current route of the user's vehicle to generate and deliver travel stay recommendations. In accordance with an embodiment, the processor 214 may be configured to determine whether to retrieve the supplemental information from the cloud server 104 to update the local sub-cache 218 with a real time or a near real-time information (associated with a type of service) on the cloud server 104. The decision may be executed by the processor 214 in accordance with the determined type of service and the updated local AI learning model. In some embodiments, the decision to update the local sub-cache 218 may be taken, by the neural circuitry 212 or the cloud server 104, based on further changes in user activity or network status of the AI-enabled device 102. The processor 214 may be further configured to determine a requirement for the supplemental information that is utilized to deliver the user consumable information. In an event when one such requirement exists, the processor 214 may be configured to selectively retrieve the supplemental information from the cloud server 104, via the communication network 108, based on the determined requirement for the supplemental information in the online state. The processor 214 may be configured to update the first information in the local sub-cache 218 with the retrieved supplemental information.

The user consumable information may be generated to assist a user (e.g., the user 112) to take improved decisions, actions, interact with different devices in vicinity of the AI-enabled device 102, automate different tasks (e.g., switching a TV "ON" when a frequently watched program is aired on a smart TV), and the like. Also, in some cases, the user consumable information may be generated to alert a user (e.g., the user 112) regarding an event, situation (e.g., a bad weather), or to call for an action pending for the user.

The user consumable information may include, but are not limited to, audio content, video content, text content, image, graphics, audio-visual notifications, actionable insights, user selectable options, guidance information, visual information, audio-visual recommendations, or a combination thereof.

The processor 214 may be further configured to control delivery of the user consumable information associated with at least one of the plurality of intelligent services of the AI-enabled device 102. The delivery of the user consumable information may be controlled based on a user input (e.g., a voice input). In some embodiments, the delivery of the user consumable information may be controlled based on a device request from the AI-enabled device 102, a request from an intelligent service on the AI-enabled device 102, or a request from a functional service on the cloud server 104. The delivery of the user consumable information may be based on at least one of the generated local sub-cache 218 or supplemental information retrievable from the cloud server 104.

The user consumable information may be delivered with a maximum dependency on the local sub-cache 218 and a minimum dependency on the supplemental information. For example, a voice input "What should I wear today?" is received through microphones of the AI-enabled device 102 (e.g., an AI-enabled smartphone). The neural circuitry 212 may receive the voice input and further handle operations of an intelligent service to manage delivery of personalized apparel recommendations (i.e., the user consumable information). The personalized apparel recommendations may be generated and/or delivered based on weather information, previously worn list of apparels, user preferences (e.g., for color, texture, day preferences, seasonal preferences, occasion or event specific preferences, etc.), and previous voice inputs that had similar context. The neural circuitry 212 may utilize a local AI learning model that is trained on different voice inputs from the user and understands different contexts, such as TV control inputs, apparel recommendations requests, and travel update requests from a user. Based on the local AI learning model, the neural circuitry 212 may be configured to determine that there is a requirement to cache images of black colored dresses stored on a cloud server. The requirement may be identified before the voice input is received based on past activities of the user. Therefore, the neural circuitry 212 may be configure to adaptively cache images of black colored dresses at a time when the network connectivity is available and network bandwidth will be least affected from a caching operation. The neural circuitry 212 may further generate and deliver a personalized apparel recommendation on the AI-enabled device 102 at a time when the voice input is received based on previously cached images of black colored dresses, and thereby the personalized apparel recommendation is delivered without dependency on the network connectivity of the AI-enabled device 102. In some cases, current weather information (i.e., the supplemental information) for a current user location may be required in real time to generate and deliver the personalized apparel recommendation. In such cases, the neural circuitry may be configured to retrieve data, i.e., the current weather information that minimally affects the network bandwidth as the data (i.e., the cached images of black colored dresses) that affects the network bandwidth has been already cached on the AI-enabled device 102 along with other information.

In certain embodiments, the user consumable information is delivered with a maximum dependency on the local sub-cache 218 and a zero dependency on the supplemental information in the offline state (e.g., an offline network connection status on the AI-enabled device 102). The maximum dependency on the local sub-cache 218 may further minimize a response time between a request to deliver the user consumable information and a delivery time of the user consumable information at the AI-enabled device 102. In contrast, conventional solutions deliver user consumable information on a conventional client device (e.g., a smart TV or a smartphone) by downloading cloud data every time the conventional client device connects to a network (e.g. internet). Different conventional services (e.g., maps, music, navigation, etc.) clog a network bandwidth that is available on the conventional device and therefore, the clogged network bandwidth increases a response time between a user request and delivery of user consumable information on the AI-enabled device 102. Also, in some cases, as some of the conventional services rely only on the cloud data (i.e., that also includes conventional user consumable information), in absence of network connectivity on the AI-enabled device 102, such conventional service may lack data resources to deliver user consumable information on the AI-enabled device 102. The disclosed AI-enabled device 102 caches cloud data at times when network connection is available on the AI-enabled device 102 and delivers user consumable information, even when network connection is not available.

In accordance with an embodiment, the processor 214 may be further configured to create a local network (e.g., the local network 110) among the AI-enabled device 102 and a plurality of secondary devices, such the secondary device 106. The created local network may be at least one of a wireless home network, a wireless local area network (WLAN), or a wireless ad hoc network (WANET). In some embodiments, the local network may have the AI-enabled device 102 as an access point (e.g., a wireless access point) for the plurality of secondary devices (e.g., the secondary device 106). The processor 214 may be configured to distribute the local sub-cache 218, stored on the AI-enabled device 102, among the plurality of secondary devices, via the generated local network. The local sub-cache 218 may be distributed in accordance with a device specification of each of the plurality of secondary devices. The device specification may indicate a capability of the plurality of secondary devices to process and generate user consumable information based on the local sub-cache 218. The local sub-cache 218 may be distributed to a local storage on the secondary device 106.

In some embodiments, the processor 214 may be further configured to transfer the generated local AI training model among the plurality of secondary devices, via the generated local network. The local AI training model may be transferred to a local storage on the plurality of secondary devices, such as the secondary device 106. Also, in some cases, the processor 214 may be configured to deliver the user consumable information, generated initially on the AI-enabled device 102, to the plurality of secondary devices connected to each other via the created local network. In accordance with an embodiment, the user consumable information may be delivered based on the distributed local sub-cache 218 at the plurality of secondary devices and computational resources of the plurality of secondary devices.

In some embodiments, the processor 214 may be further configured to identify user-sensitive information and public information in the local sub-cache 218 (that may include the first information) on the AI-enabled device 102. The processor 214 may be configured to assign a security privilege level to the identified user-sensitive information from the local sub-cache 218 for a type of intelligent service (e.g., a smart TV control service). The security privilege level may be assigned based on pre-specified sensitivity information and a set of user-specified permissions. For example, the local sub-cache 218 may include a user's login data, which may be set by the user (e.g., the user 112) (or based on a service policy) as private data, i.e., user-sensitive information. Also, the local sub-cache 218 may include TV program schedule, which may be pre-specified as public data by a publisher of TV content.

In accordance with an embodiment, the processor 214 may be further configured to share the identified user-sensitive information with a secondary device (e.g., the secondary device 106) via a local network (e.g., the local network 110). The identified user-sensitive service information may be shared based on authentication of the plurality of secondary devices for the assigned security level on the identified user-sensitive information. For example, if both the AI-enabled device 102 and the secondary device 106 are shared by a common user, or a collective set of users (e.g., a family member that is registered on a smart TV (i.e., the AI-enabled device 102) and on a smartphone (i.e., the secondary device 106). The user-sensitive information on the smart TV may be shared with the smartphone, via the local network, in a case where the smartphone is authenticated with the assigned security level. The detailed operation of the AI-enabled device 102 has been further described, for example, in FIG. 3 and FIG. 4, respectively.

Figure 3:
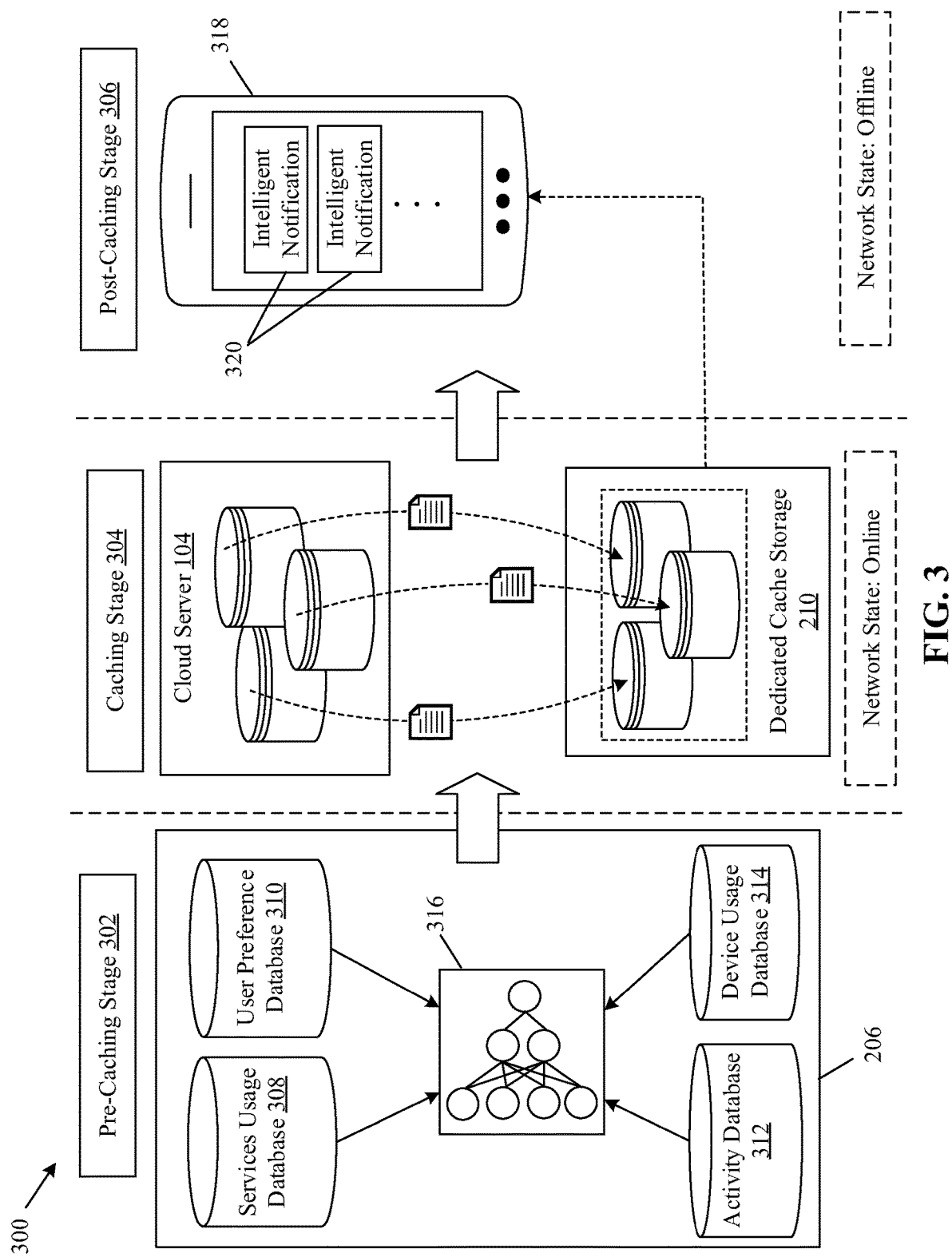
FIG. 3 illustrates an exemplary scenario for implementation of the AI-enabled device of FIG. 2 for delivery of user consumable information independent of network connectivity, in accordance with an embodiment of the disclosure.

FIG. 3 illustrates an exemplary scenario for implementation of the AI-enabled device of FIG. 2 for delivery of user consumable information independent of network connectivity, in accordance with an embodiment of the disclosure. FIG. 3 is explained in conjunction with elements from FIGS. 1 and 2. With reference to FIG. 3, there is shown a first scenario 300 that depicts different stages of operation of the AI-enabled device 102 for the delivery of user consumable information independent of network connectivity. The different states may include a pre-caching stage 302, a caching stage 304, and a post-caching stage 306.

In the pre-caching stage 302, there is shown a service usage database 308, a user preference database 310, an activity database 312, a device usage database 314, and a local AI learning model 316 stored in the memory 206 of an AI-enabled device, such as an AI-enabled smartphone 318.

For example, the AI-enabled smartphone 318 may receive a user input that may be a request to update the user (e.g., the user 112) related to a weather forecast for next day. The AI-enabled smartphone 318 may display a prompt for the user (e.g., the user 112) for a confirmation of the request before calling an intelligent service. The AI-enabled smartphone 318 may call (an API call) functional services of the cloud server 104 to retrieve a weather forecast. The AI-enabled smartphone 318 may serve weather forecast information for the next day. The AI-enabled smartphone 318 may concurrently also check various applications, for example, the calendar application on the AI-enabled smartphone 318 and may find that the user (e.g., the user 112) has an appointment with doctor for the next day. The AI-enabled smartphone 318 may cache the information in the local sub-cache 218 and may also remind the user (e.g., the user 112) to carry an umbrella as it may rain and start early from his home location as there may be congestion on road due to rain.

The request received, by the AI-enabled smartphone 318, may be at least one of a user request, a device request, a request initiated by the at least one intelligent service on the AI-enabled smartphone 318. The memory 206 of the AI-enabled smartphone 318 may be configured to store instructions associated with a plurality of intelligent services that operates on the AI-enabled smartphone 318. Also, the memory 206 may be further configured to collect and store a set of user preferences, network connectivity information of the AI-enabled smartphone 318, first usage information of the plurality of intelligent services, and second usage information of the AI-enabled smartphone 318.

In accordance with an embodiment, different instructions and informations may be stored in different dedicated databases in the memory 206, present on the AI-enabled smartphone 318. The different databases may include the service usage database 308, the user preference database 310, the activity database 312, and the device usage database 314. The service usage database 308 may include usage data of different intelligent and non-intelligent services on the AI-enabled smartphone 318. As an example, the service usage database 308 may include details of application programming interface (API) calls that are made by different intelligent services (using the processor 214) to interact with different APIs of functional services on the cloud server 104. The user preference database 310 may include a daily or historical user preference related to different services (e.g., maps, navigations, location, television, calendar scheduling, etc.) offered on the AI-enabled smartphone 318, for example, music preferences, food preferences based on orders received through the AI-enabled smartphone 318, and the like. The activity database 312 may include details of user's activity on the AI-enabled smartphone 318 and with other devices, for example, a smart TV, that are connected or share a common network (e.g., the local network 110) with the AI-enabled smartphone 318. Also, the activity database 312 may further include usage of different functional services on the cloud server 104 or different intelligent services on the AI-enabled smartphone 318. As an example, the usage details may include how the weather information or navigation information is used and accessed on the AI-enabled smartphone 318 while the user (e.g., the user 112) may be driving.

The device usage database 314 may include information of device usage, which may include, but are not limited to, device access logs, network connectivity information at different timestamps, usage duration of different device features (e.g., camera, internet, microphone, calling, etc.) along with a user access rate for different types of AI applications and non-AI applications on the AI-enabled smartphone 318. The network connectivity information of the AI-enabled smartphone 318 may include bandwidth of the network, type of network, network connection status (e.g., network connected/disconnected) at different time stamps, duration of the network connection and the like may be stored in the device usage database 314.

In the pre-caching stage 302, the local AI learning model 316 associated with the AI-enabled smartphone 318 may be generated based on the data from the service usage database 308, the user preference database 310, and the activity database 312, and the device usage database 314. Alternatively stated, the local AI learning model 316 may be trained based on the data from the service usage database 308, the user preference database 310, the activity database 312, and the device usage database 314. In accordance with an embodiment, the local AI learning model 316 may be further updated based on a real time or a near-real time change in user activity on the AI-enabled smartphone 318. The data from the service usage database 308, the user preference database 310, the activity database 312, and the device usage database 314 may selectively change with the change in the user activity.

In the pre-caching stage 302, the processor 214 may be configured to determine a type of service (e.g., a weather forecast service) associated with at least one of the plurality of intelligent services (e.g., commute updates and routes based on weather forecast information), information for which is to be cached at the dedicated cache storage 210. The type of service may be determined based on the application of the trained local AI learning model 316 on the data received from the service usage database 308, the user preference database 310, the activity database 312, and the device usage database 314.

For example, for a commute update service on the AI-enabled smartphone 318, the processor 214 may determine services, e.g., a weather service and a navigation service, for which more information is required from the cloud server 104. The processor 214 determine a requirement of weather data for a region that is hyper local to the user (e.g., the user 112) of the AI-enabled smartphone 318 and a daily commute route that is taken by the user (e.g., the user 112) from office to home. In some embodiments, the requirement may be determined based on the trained local AI learning model 316 on data received from the service usage database 308, the user preference database 310, the activity database 312, and the device usage database 314. Also, in some cases, the requirement may be further determined based on the request (that may include request data, such as a user voice input) received from the user, an intelligent service on the AI-enabled smartphone 318, or a functional service on the cloud server 104.

In the caching stage 304, there is shown a cloud server (i.e., the cloud server 104) and the dedicated cache storage 210 present in the memory 206 of the AI-enabled smartphone 318. The dedicated cache storage 210 may be allocated, by the processor 214, in the memory 206 of the AI-enabled smartphone 318. The dedicated cache storage 210 may be allocated for a type of service associated with the plurality of intelligent services. The first information associated with the determined type of service may be cached from the cloud server 104 to a local sub-cache (shown in the caching stage 304) in the dedicated cache storage 210 of the memory 206 of the AI-enabled smartphone 318. The first information of the determined type of service may be adaptively cached during at least one of a background activity or a foreground activity of the AI-enabled smartphone 318. Also, the first information may be cached in accordance with an offline state or an online state (specified in the network connectivity information) of the AI-enabled smartphone 318. Alternatively stated, the first information may be cached in a period when the AI-enabled smartphone 318 is connected to a network (which allows connectivity to the cloud server 104) and an impact of caching of the first information on the network bandwidth available to the AI-enabled smartphone 318 is minimal (or optimal). The adaptability may be implemented by intelligently monitoring status of the network and user activity on the AI-enabled smartphone 318. For example, if it is known from device logs that a user "X" access a chatting service on the AI-enabled smartphone 318, between 9:00 AM to 10:30 AM, then the caching of the first information may be scheduled after 10:30 AM for user consumable information that may have to be delivered after 10:30 AM.

In accordance with an embodiment, the cached first information may be downloaded from the cloud server 104, via the communication network 108, for example, via an internet connection and updated, at specific time intervals as a background service on the AI-enabled smartphone 318. For example, the user (e.g., the user 112) may ask for the news headline daily, the AI-enabled smartphone 318 may not cache first information associated with news information from the cloud server 104 every time the AI-enabled smartphone 318 connects to a network (e.g., an internet network). Instead, the news information may be cached at a specific time of day when the AI-enabled smartphone 318 may witness low network activity or a device activity. The first information may be further cached in the local sub-cache 218 based on user's profile, user preferences, or use cases inferred from daily AI learnings on the AI-enabled smartphone 318.

In the caching stage 304, the processor 214 may be further configured to determine whether to retrieve supplemental information from the cloud server 104, to update the local sub-cache 218 with real time or near real-time updates (associated with a type of service) in accordance to the determined type of service and the updated AI learning model. In accordance with an embodiment, the AI-enabled smartphone 318 may be further configured to selectively retrieve the supplemental information from the cloud server 104, via the communication network 108, based on the determined requirement for the supplemental information from the cloud server 104 in the online state. In accordance with an embodiment, the AI-enabled smartphone 318 may be further configured to update the first information in the local sub-cache with the retrieved supplemental information.

In accordance with an embodiment, the neural circuitry 212 in the AI-enabled smartphone 318 may decide whether to apply the cached first information in local sub-cache or pull new information/update from the cloud server 104, to update the first information in the local sub-cache 218 of the dedicated cache storage 210 of the memory 206, in the AI-enabled smartphone 318.

In the post-caching stage 306, there is shown a display screen of the AI-enabled smartphone 318. The post-caching stage 306 may be done after the first information has been cached in the local sub-cache 218 of the dedicated cache storage 210. The processor 214 on the AI-enabled smartphone 318 may control a delivery of user consumable information (associated with at least one of the plurality of intelligent services) on the AI-enabled smartphone 318. The controlled delivery of the user consumable information may be done based on at least one of the local sub-cache 218 or the supplemental information retrievable from the cloud server 104. As an example, as shown in the post-caching stage 306, the user consumable information may include a set of intelligent notifications 320 that may be generated and delivered, by the neural circuitry 212, on the AI-enabled smartphone 318, based on the local sub-cache 218 in the memory 206. For example, the set of intelligent notifications 320 may indicate a "call to action" for a specific type of intelligent service, an actionable insight as per user's preferences, an alert message for an event or situation associated with the user.

FIG. 4 illustrates an exemplary scenario of a local network environment between the AI-enabled device of FIG. 2 and a secondary device, where the AI-enabled device acts as an access point for the secondary device, in accordance with an embodiment of the disclosure. FIG. 4 is explained in conjunction with elements from FIGS. 1, 2, and 3. With reference to FIG. 4, there is shown a second scenario 400, where a smart TV 402, a smartphone 404, and a smart speaker 406 are communicatively coupled to each other via a local network 408.

The smart TV 402 may be an AI-enabled smart TV. There is further shown a local sub-cache 410 in the smart TV 402. In some embodiments, the local sub-cache 410 may include different data fragments, based on a plurality of intelligent services associated with the smart TV 402. In other words, different intelligent services may have a separate data fragment in the local sub-cache 410 or may have a dedicated local sub-cache in a cache storage in the smart TV 402.

In accordance with an embodiment, the intelligent services of the smartphone 404 and the smart speaker 406 may need to connect to the cloud server 104 for a delivery of user consumable information. However, at times, the network connectivity between the secondary devices like the smartphone 404 and the cloud server 104 may be slow, absent or may not be reliable in certain situations. For example, some AI services may require access to or integration with end users current data. When such data may be sensitive (e.g. personal information), integrating them with a remote service, like the cloud server 104 may be risky, or may conflict with data regulations. Therefore, for user sensitive data, the local network 408 may be generated at an AI-enabled device, like the smart TV 402. The intelligent services at the smartphone 404 may manage the local sub-cache 410, via the local network 408, with or without internet access in real time or near real-time. For example, for a simple operation like switch on the smart TV 402 using a voice input from user, there is no need to interact with the cloud server 104. The smart TV 402 may itself process the voice input based on cache data in the local sub-cache 410 and switch on the smart TV 402.

In accordance with an embodiment, the smart TV 402 may be further configured to create the local network 408 to connect with a plurality of secondary devices, i.e., the smartphone 404 and the smart speaker 406. The smart TV 402 may be further configured to distribute the local sub-cache 410 between the smartphone 404 and the smart speaker 406, via the generated local network 408. The local sub-cache 410 may be distributed in accordance with a device specification that may indicate capability of the smartphone 404 and the smart speaker 406 to process application-specific information from the distributed local sub-cache 410. The local sub-cache 410 may be distributed to a local storage on the smartphone 404 and the smart speaker 406, respectively. The smartphone 404 may include a fragment 412 of the local sub-cache 410 and the smart speaker 406 may include a fragment 414 of the local sub-cache 410. The local sub-cache 410 may be distributed in order to allow secondary devices that are not connected to network (e.g., internet) to deliver consumable information on the smartphone 404 and the smart speaker 406 (i.e., the secondary device 106). The local sub-cache 410 may be further distributed in order to allow secondary devices that may need information specific to the AI-enabled device 102 to deliver consumable information on the smartphone 404 and the smart speaker 406 (i.e., the secondary device 106). Also, the local sub-cache 410 may be further distributed in order to save time and bandwidth for caching operation on the secondary devices when the local sub-cache 410 is already present on the smart TV 402. For example, in order to recommend a time to switch on the smart TV 402 to view a program, the smart speaker 406 may need the local sub-cache 410 (or a fragment of the local sub-cache 410) that includes details of different schedules and other episode information for the program that is daily watched on the smart TV 402.

The smart TV 402 may be further configured to transfer a local AI learning model (generated on the smart TV 402) to the smartphone 404 and the smart speaker 406, via the generated local network 408. In accordance with an embodiment, the local AI learning model may be transferred when the secondary devices (i.e., the smartphone 404 and the smart speaker 406) lack the capacity to generate and train a local AI-learning model or when the transfer of the local AI learning model may save re-training and development time for the secondary devices. More specifically, the local AI training model may be transferred to the local storage on the smartphone 404 and to the local storage on the smart speaker 406. The transferred local AI learning model may be previously trained on data (as described in FIGS. 1, 2, and 3) stored and collected in real time on the smart TV 402. In some embodiments, the smartphone 404 and the smart speaker 406 may only receive a portion of the local AI learning model, which is trained on data that is specific to the intelligent services that can be availed via the smartphone 404 and the smart speaker 406. For example, the smart speaker 406 may receive a portion of the local AI learning model that is trained on the voice inputs from a user (e.g., the user 112) and intelligent services (e.g., voice-based selection of a programming channel, on-air program, or an on-demand program on the smart TV 402) that may require a microphone, a speaker, or a conversational agent on the smart TV 402.

The smart TV 402 may be further configured to deliver user consumable information to the smartphone 404 and the smart speaker 406 connected to each other via the generated local network 408. The user consumable information may be delivered based on computational resources of the smartphone 404 and the smart speaker 406. Also, the user consumable information may be delivered based on accessibility of the smartphone 404 and the smart speaker 406 to the user. The computational resources may indicate a capability of the smartphone 404 and the smart speaker 406 to output the user consumable information in a certain manner that is possible for the smartphone 404 and the smart speaker 406. Alternatively stated, the capability represents a configured means (e.g., a speech output for the smart speaker) through which the user consumable information is generated and/or delivered by the smartphone 404 and the smart speaker 406. The smart speaker 406 may only receive voice-based user consumable information from the smart TV 402, for delivery to a user. The smart TV 402 may not deliver visual notifications (i.e. user consumable information) to the smart speaker 406 as visual display may be absent from smart speaker 406. For example, the smart speaker 406 may output the user consumable information through voice instructions or conversations with a user. Similarly, the smartphone 404 may be currently accessible to the user, instead of the smart TV 402. Therefore, the smartphone 404 may be selected to output the user consumable information instead of the smart TV 402.

Figure 5A:
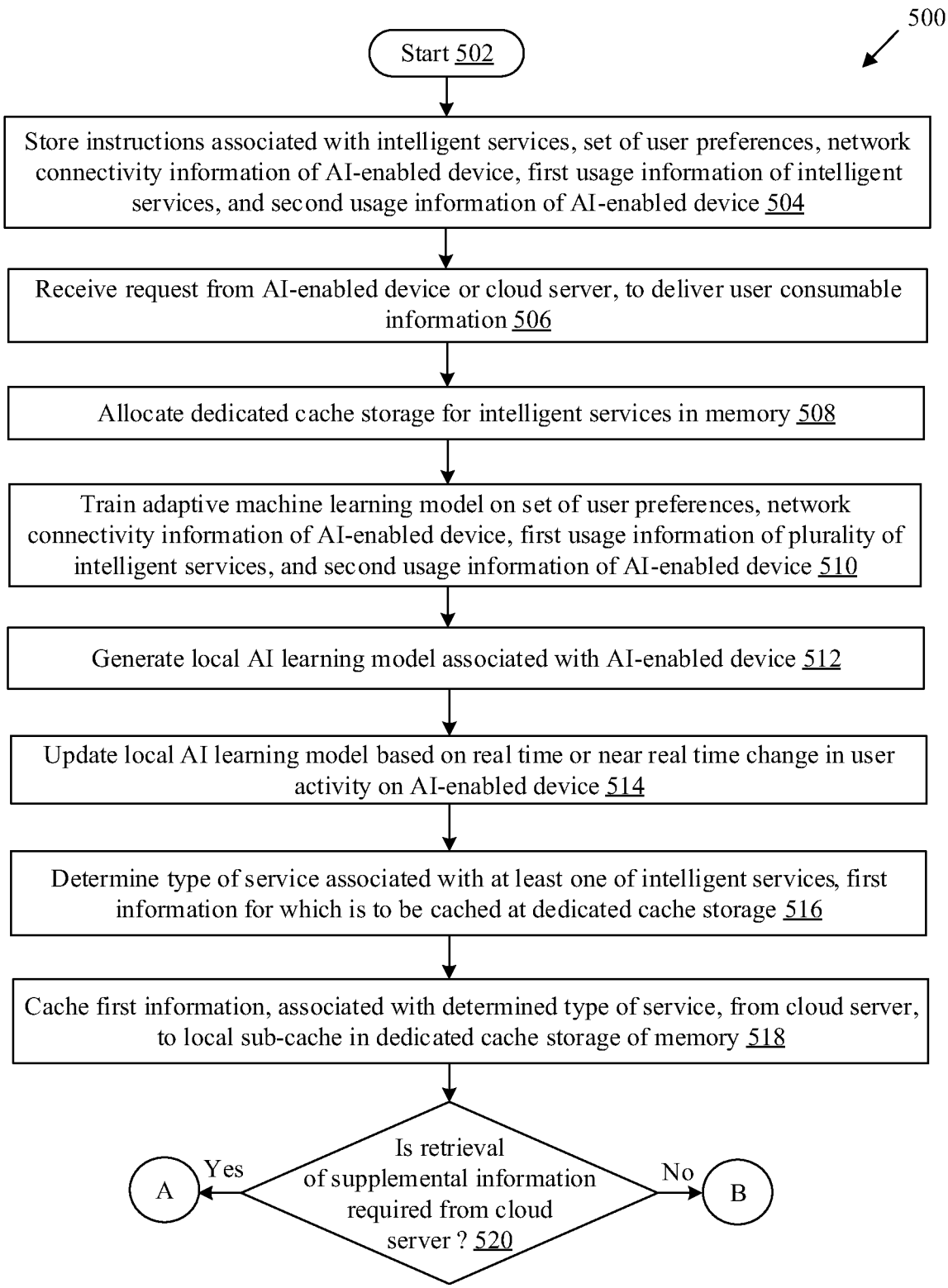
FIGS. 5A to 5C, is a flowchart that collectively illustrates exemplary operations for delivery of user consumable information independent of network connectivity.
Figure 5B:
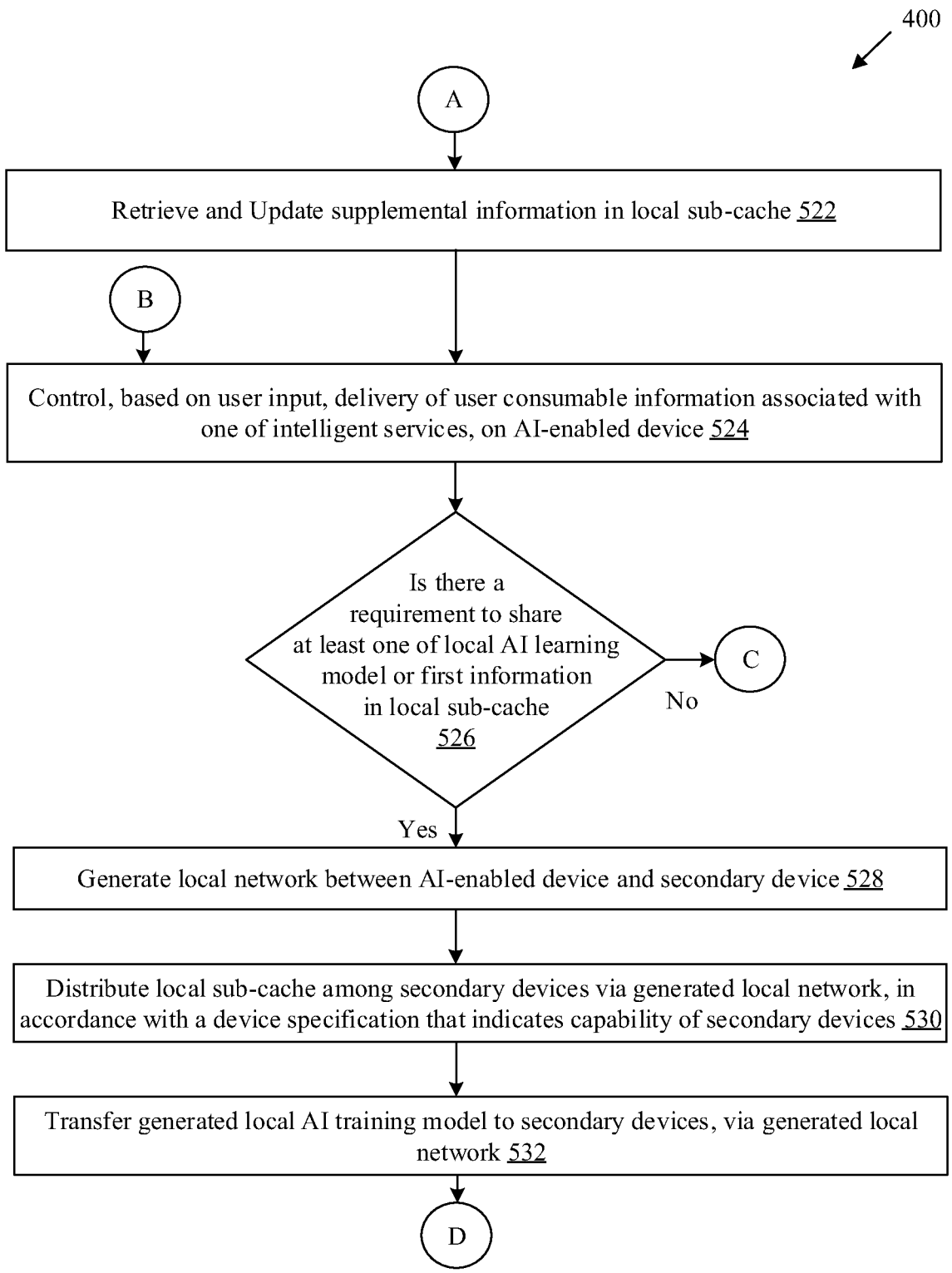
Figure 5C:
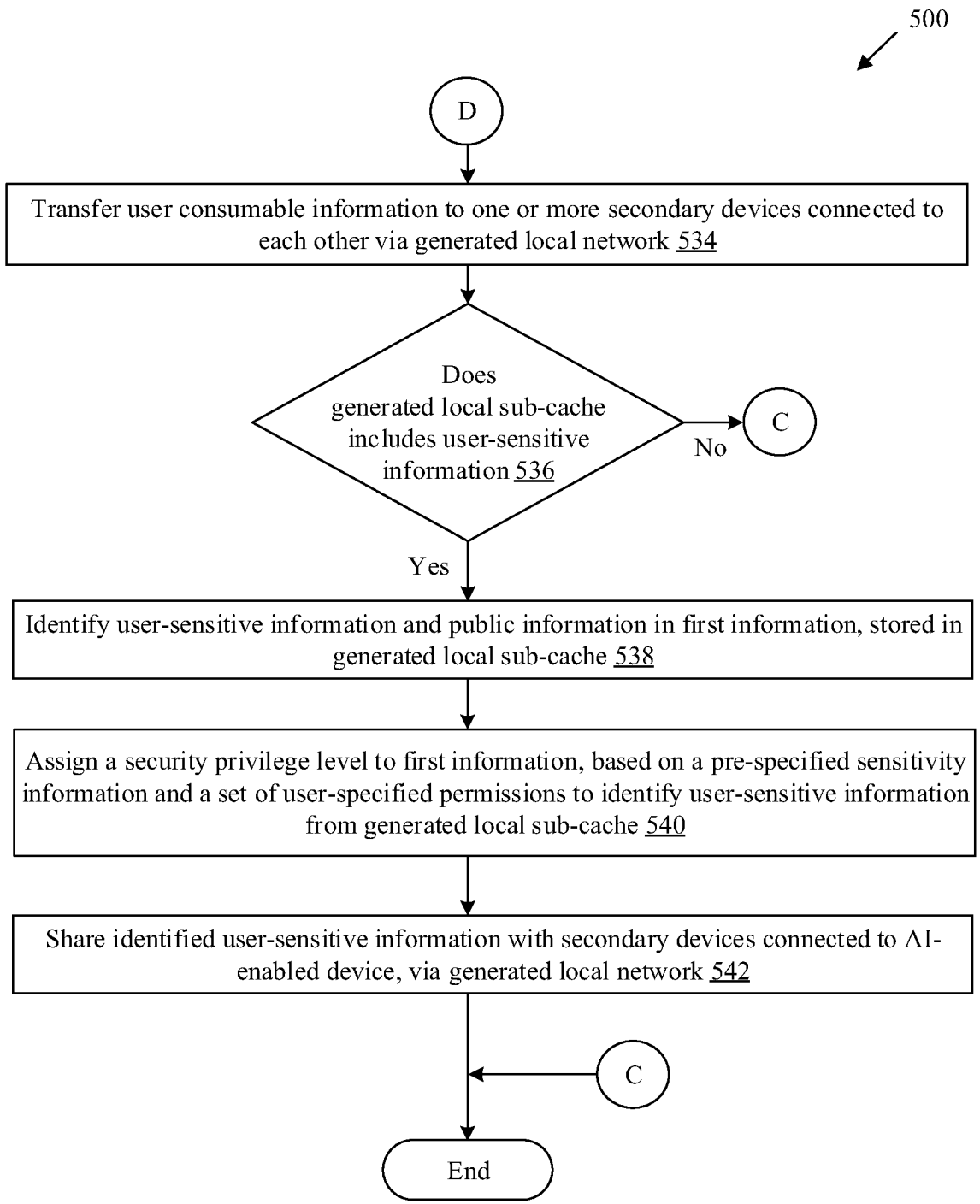

FIGS. 5A to 5C, collectively illustrate a flowchart that depicts exemplary operations for delivery of user consumable information independent of network connectivity, in accordance with an embodiment of the disclosure. FIG. 5 is explained in conjunction with elements from FIGS. 1, 2, 3, and 4. With reference to FIG. 5, there is shown a flowchart 500. The method, in accordance with the flowchart 500, may be implemented on the AI-enabled device 102. The method starts at 502 and proceeds to 504.

At 504, instructions associated with the plurality of intelligent services that operates on AI-enabled device 102, a set of user preferences, network connectivity information of the AI-enabled device 102, first usage information of the plurality of intelligent services, and second usage information of the AI-enabled device 102 may be stored. The memory 206 may be configured to store the instructions associated with the plurality of intelligent services. Also, the memory 206 may be configured to store the set of user preferences, the network connectivity information of the AI-enabled device 102, the first usage information of the plurality of intelligent services, and the second usage information of the AI-enabled device 102.

At 506, a request may be received from AI-enabled device 102 or the cloud server 104 to deliver user consumable information. The neural circuitry 212 may be configured to receive the request from AI-enabled device 102 or the cloud server 104, to deliver user consumable information.

At 508, the dedicated cache storage 210 for plurality of intelligent services may be allocated in the memory 206. The neural circuitry 212 may be configured to allocate the dedicated cache storage 210 for the plurality of intelligent services in the memory 206 on the AI-enabled device 102.

At 510, an adaptive machine learning model may be trained on the set of user preferences, the network connectivity information of the AI-enabled device 102, the first usage information of the plurality of intelligent services, and the second usage information of the AI-enabled device 102. The neural circuitry 212 may be configured to train an adaptive machine learning model on the set of user preferences, the network connectivity information of the AI-enabled device 102, the first usage information of the plurality of intelligent services, and the second usage information of the AI-enabled device 102.

At 512, a local AI learning model may be generated associated with AI-enabled device 102. Such generation of the local AI learning model may be done based on the set of user preferences, the network connectivity information of the AI-enabled device 102, and the first usage information of the plurality of intelligent services. The learning circuit 216 of the neural circuitry 212 may be configured to generate the local AI learning model (associated with AI-enabled device 102) on the AI-enabled device 102.

At 514, the local AI learning model may be updated based on real time or near-real time change in a user activity on the AI-enabled device 102. The learning circuit 216 of the neural circuitry 212 may be configured to update the local AI learning model based on real time or near real time change in the user activity on the AI-enabled device 102. The set of user preferences, the first usage information, and the second usage information may selectively change with a change in the user activity.

At 516, a type of service associated with at least one of plurality of intelligent services may be determined, for which first information is to be cached at the dedicated cache storage 210. Such determination of the type of service may be done based on the generated local AI learning model and the second usage information of the AI-enabled device 102. The neural circuitry 212 may be configured to determine a type of service, for which first information is to be cached at the dedicated cache storage 210.

At 518, the first information, associated with determined type of service may be cached from the cloud server 104, to the local sub-cache 218 in the dedicated cache storage 210 of the memory 206. The neural circuitry 212 may be configured to cache the first information, associated with determined type of service, from the cloud server 104, to the local sub-cache 218 in the dedicated cache storage 210 of the memory 206.

At 520, it may be determined whether a retrieval of the supplemental information is required from the cloud server 104. The neural circuitry 212 may be configured to determine whether the retrieval of the supplemental information is required from the cloud server 104. In a case where the requirement exists, control passes to 522. Otherwise, control passes to 524.

At 522, the supplemental information may be retrieved and updated in the local sub-cache 218. The neural circuitry 212 may be configured to retrieve and update the supplemental information in the local sub-cache 218.

At 524, delivery of user consumable information, associated with one of the plurality of intelligent services of AI-enabled device 102, may be controlled based on a user input. The neural circuitry 212 may be configured to control, based on the user input, delivery of user consumable information, associated with one of the plurality of intelligent services, on the AI-enabled device 102.

At 526, it may be determined whether a requirement to share at least one of the local AI learning model or the first information in the local sub-cache 218 exists. The neural circuitry 212 (or a functional service on the cloud server 104) may be configured to determine whether the requirement to share the local AI learning model or the first information in the local sub-cache 218 exists. In a case where the requirement exists, control passes to 528. Otherwise, control passes to end.

At 528, a local network (e.g., the local network 110) may be generated between the AI-enabled device 102 and the secondary device 106. The neural circuitry 212 may be configured to generate the local network between the AI-enabled device 102 and the secondary device 106.

At 530, the local sub-cache 218 may be distributed among a plurality of secondary devices via the generated local network 110, in accordance with a device specification that indicates capability of plurality of the secondary devices. The neural circuitry 212 may be configured to distribute the local sub-cache 218 among the plurality of secondary devices via the generated local network 110, in accordance with a device specification that indicates capability of the plurality of the secondary devices.

At 532, the generated local AI training model may be transferred to the plurality of secondary devices, via the generated local network 110. The neural circuitry 212 may be configured to transfer the generated local AI training model to the plurality of secondary devices, via the generated local network 110.

At 534, the user consumable information may be transferred to one or more secondary devices of the plurality of secondary devices connected to each other via the generated local network 110. The neural circuitry 212 may be configured to transfer the user consumable information to the one or more secondary devices connected to each other via the generated local network 110.

At 536, it may be determined whether the generated local sub-cache 218 includes user-sensitive information. The neural circuitry 212 may be configured to determine whether the generated local sub-cache 218 includes user-sensitive information. In a case where user-sensitive information is included in the generated local sub-cache 218, control passes to 538. Otherwise, control passes to end.

At 538, the user-sensitive information and public information may be identified in the first information stored in generated local sub-cache 218. The neural circuitry 212 may be configured to identify the user-sensitive information and public information in the first information, stored in generated local sub-cache 218.

At 540, a security privilege level may be assigned to the first information, based on a pre-specified sensitivity information and a set of user-specified permissions to identify user-sensitive information from the generated local sub-cache 218. The neural circuitry 212 may be configured to assign a security privilege level to the first information, based on a pre-specified sensitivity information and a set of user-specified permissions. The security privilege level may be assigned to identify the user-sensitive information in the generated local sub-cache 218.

At 542, the identified user-sensitive information may be shared with the plurality of secondary devices connected to the AI-enabled device 102, via the generated local network 110. The neural circuitry 212 may be configured to share the identified user-sensitive information with the plurality of secondary devices connected to the AI-enabled device 102, via the generated local network 110. The identified user-sensitive service information may be shared based on authentication of the plurality of secondary devices for the assigned security level. Control passes to end.

Various embodiments of the disclosure may provide a non-transitory computer readable medium and/or storage medium, and/or a non-transitory machine readable medium and/or storage medium with a machine code and/or a set of instructions stored thereon and executable by a machine and/or a computer to provide user consumable information independent of network connectivity. The set of instructions in the AI-enabled device 102 may cause the machine and/or computer to store instructions associated with a plurality of intelligent services that operates in the AI-enabled device 102. The neural circuitry may be configured to allocate a dedicated cache storage for the plurality of intelligent services, generate a local AI learning model associated with the AI-enabled device, and determine a type of service associated with at least one of the plurality of intelligent services. The neural circuitry may be configured to cache first information associated with the determined type of service from a cloud server to a local sub-cache in the dedicated cache storage of the memory. The neural circuitry may be configured to control, based on a user input, delivery of user consumable information associated with at least one of the plurality of intelligent services of the AI-enabled device.

Various embodiments of the present disclosure may be found in a method and an AI-enabled device (e.g., the AI-enabled device 102) that handles delivery of user consumable information independent of network connectivity of the AI-enabled device. The AI-enabled device may include a memory (e.g., the memory 206) and neural circuitry (e.g., the neural circuitry 212). The memory may be configured to store instructions associated with a plurality of intelligent services that operates in the AI-enabled device, a set of user preferences, network connectivity information of the AI-enabled device, first usage information of the plurality of intelligent services, and second usage information of the AI-enabled device. The neural circuitry may handle operations of the plurality of intelligent services on the AI-enabled device. The neural circuitry may be configured to allocate a dedicated cache storage (e.g., the dedicated cache storage 210) for the plurality of intelligent services and generate a local AI learning model associated with the AI-enabled device. The local AI learning model may be generated based on the set of user preferences, the network connectivity information of the AI-enabled device, and the first usage information of the plurality of intelligent services. The neural circuitry may be further configured to determine a type of service associated with at least one of the plurality of intelligent services, first information for which is to be cached at the dedicated cache storage. The type of service may be determined based on the generated local AI learning model and the second usage information of the AI-enabled device. The neural circuitry may be further configured to cache the first information, associated with the determined type of service, from a cloud server (e.g., the cloud server 104) to a local sub-cache (e.g., the local sub-cache 218) in the dedicated cache storage of the memory. The first information of the determined type of service may be adaptively cached during at least one of a background activity or a foreground activity of the AI-enabled device. Also, the first information may be cached in accordance with an offline state or an online state, specified in the network connectivity information, of the AI-enabled device. The first information may be further cached based on a mapping of the determined type of service to a corresponding functional service on the cloud server. The neural circuitry may be further configured to control, based on a user input, delivery of user consumable information, associated with at least one of the plurality of intelligent services, on the AI-enabled device. The delivery may be controlled further based on at least one of the generated local sub-cache and supplemental information retrievable from the cloud server.

The user consumable information may be delivered with a maximum dependency on the local sub-cache and a minimum dependency on the supplemental information. In some embodiments, the user consumable information may be delivered further based on a request received from at least one of the AI-enabled device and the cloud server. The request may be at least one of a user request, a device request, a request initiated by the at least one intelligent service, or the functional service on the cloud server. As an example, the user consumable information associated with the plurality of intelligent services may include at least one of audio content, video content, text content, image, graphics, and audio-visual notifications. The maximum dependency on the generated local sub-cache may further minimize a response time between a request to deliver the user consumable information and a delivery time of the user consumable information at the AI-enabled device. In certain embodiments, the user consumable information is delivered with a maximum dependency on the local sub-cache and a zero dependency on the supplemental information, in the offline state of the AI-enabled device.

In accordance with an embodiment, the neural circuitry may be further configured to train an adaptive machine learning model on the set of user preferences, the network connectivity information of the AI-enabled device, the first usage information of the plurality of intelligent services, and the second usage information of the AI-enabled device. The local AI learning model may be generated further based on the trained adaptive machine learning model. The local AI learning model may be generated based on at least one of a machine learning model, a deep learning model, and a Bayesian model. The neural circuitry may be further configured to update the local AI learning model based on a real time or a near-real time change in a user activity on the AI-enabled device. The set of user preferences, the first usage information, and the second usage information may selectively change with the change in the user activity.

In accordance with an embodiment, the neural circuitry may be further configured to determine whether to retrieve the supplemental information from on the cloud server, to update the supplemental information in the generated local sub-cache. Also, the neural circuitry may be configured to determine a requirement for the supplemental information that is utilized to deliver the user consumable information. Thereafter, the neural circuitry may be further configured to selectively retrieve the supplemental information from the cloud server, via a communication network, based on the determined requirement for the supplemental information in the online state. The first information may be updated in the generated local sub-cache with the retrieved supplemental information.

In accordance with an embodiment, the neural circuitry may be further configured to generate a local network (e.g., the local network 110) among the AI-enabled device and a plurality of secondary devices (e.g., the secondary device 106). The generated local network may be at least one of a wireless home network, a wireless local area network, or a wireless ad hoc network. The AI-enabled device may act as an access point for the plurality of secondary devices. Thereafter, the neural circuitry may be further configured to distribute the generated local sub-cache in the AI-enabled device among the plurality of secondary devices, via the generated local network. The generated local cache may be distributed in accordance with a device specification that indicates capability of the plurality of secondary devices. More specifically, the generated local sub-cache may be distributed to a local storage on the plurality of secondary devices.

In accordance with an embodiment, the neural circuitry may be further configured to transfer the generated local AI training model among the plurality of secondary devices, via the generated local network. The local AI training model may be transferred to a local storage on the plurality of secondary devices. Also, in some cases, the neural circuitry may be further configured to deliver the user consumable information to one or more secondary devices of the plurality of secondary devices, connected to each other via the generated local network. The user consumable information may be delivered, based on the distributed local sub-cache on the plurality of secondary devices and computational resources of the plurality of secondary devices.

In accordance with an embodiment, the neural circuitry may be further configured to identify the generated local sub-cache that includes the first information, into user-sensitive information and public information. The neural circuitry may be further configured to assign a security privilege level to the identified user-sensitive information from the generated local sub-cache of the type of service. The security privilege level may be assigned based on pre-specified sensitivity information and a set of user-specified permissions. In some embodiments, the neural circuitry may be further configured to share the identified user-sensitive information with the plurality of secondary devices connected, via a local network, with the AI-enabled device. The identified user-sensitive service information may be shared based on authentication of the plurality of secondary devices for the assigned security level on the identified user-sensitive information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An artificial intelligence (Al)-enabled device, comprising:
 a memory configured to store instructions associated with a plurality of intelligent services that operates in the Al-enabled device, a set of user preferences, network connectivity information of the Al-enabled device, first usage information of the plurality of intelligent services, and second usage information of the Al-enabled device; and
 neural circuitry that handles operations of the plurality of intelligent services on the Al-enabled device, wherein the neural circuitry is configured to:
  allocate a dedicated cache storage for the plurality of intelligent services;
  generate a local Al learning model associated with the Al-enabled device, wherein the local Al learning model is generated based on the set of user preferences, the network connectivity information of the Al-enabled device, and the first usage information of the plurality of intelligent services;
  determine a type of service and first information, wherein
   the type of service is associated with at least one of the plurality of intelligent services,
   the first information is associated with the determined type of service,
   the first information cached at the dedicated cache storage, based on the generated local Al learning model and the second usage information of the Al-enabled device;
  cache the first information associated with the determined type of service from a cloud server to a local sub-cache in the dedicated cache storage of the memory, wherein
   the first information of the determined type of service is adaptively cached during at least one of a background activity or a foreground activity of the Al-enabled device, based on offline state or an online state, specified in the network connectivity information, of the Al-enabled device, and
   the first information is cached based on a mapping of the determined type of service to a corresponding functional service on the cloud server; and
  control, based on a user input, delivery of user consumable information, associated with at least one of the plurality of intelligent services, on the Al-enabled device, based on at least one of the local sub-cache or supplemental information retrievable from the cloud server, wherein the user consumable information is delivered with a maximum dependency on the local sub-cache and a minimum dependency on the supplemental information.

2. The Al-enabled device according to claim 1, wherein the neural circuitry is further configured to train an adaptive machine learning model on the set of user preferences, the network connectivity information of the Al-enabled device, the first usage information of the plurality of intelligent services, and the second usage information of the Al-enabled device, wherein the local Al learning model is generated further based on the trained adaptive machine learning model.

3. The Al-enabled device according to claim 1, wherein the neural circuitry is further configured to update the local Al learning model based on one of a real time or a near-real time change in a user activity on the Al-enabled device, wherein each of the set of user preferences, the first usage information, and the second usage information selectively changes with a change in the user activity.

4. The Al-enabled device according to claim 3, wherein the neural circuitry is further configured to determine whether to retrieve the supplemental information from on the cloud server, to update the supplemental information in the local sub-cache.

5. The Al-enabled device according to claim 1, wherein the local Al learning model is generated based on at least one of a machine learning model, a deep learning model, or a Bayesian model.

6. The Al-enabled device according to claim 1, wherein the neural circuitry is further configured to:
  determine a requirement for the supplemental information that is utilized to deliver the user consumable information;
  selectively retrieve the supplemental information from the cloud server via a communication network, based on the determined requirement for the supplemental information in the online state; and
  update the first information in the local sub-cache with the retrieved supplemental information.

7. The Al-enabled device according to claim 1, wherein the neural circuitry is further configured to generate a local network among the Al-enabled device and a plurality of secondary devices, wherein
  the generated local network is at least one of a wireless home network, a wireless local area network, or a wireless ad hoc network, and
  the Al-enabled device acts as an access point for the plurality of secondary devices.

8. The Al-enabled device according to claim 7, wherein the neural circuitry is further configured to distribute the local sub-cache in the Al-enabled device among the plurality of secondary devices, via the generated local network, based on a device specification that indicates capability of the plurality of secondary devices, wherein the local sub-cache is distributed to a local storage on the plurality of secondary devices.

9. The Al-enabled device according to claim 7, wherein the neural circuitry is further configured to transfer the generated local Al learning model among the plurality of secondary devices, via the generated local network, wherein the local Al learning model is transferred to a local storage on the plurality of secondary devices.

10. The Al-enabled device according to claim 7, wherein the neural circuitry is further configured to deliver the user consumable information to at least one secondary devices of the plurality of secondary devices connected to each other via the generated local network.

11. The Al-enabled device according to claim 10, wherein the user consumable information is delivered, based on the local sub-cache on the plurality of secondary devices and computational resources of the plurality of secondary devices.

12. The Al-enabled device according to claim 1, wherein the neural circuitry is further configured to identify the local sub-cache that comprises the first information, into user-sensitive information and public information.

13. The Al-enabled device according to claim 12, wherein the neural circuitry is further configured to assign a security privilege level to the user-sensitive information from the local sub-cache of the type of service, wherein the security privilege level is assigned based on pre-specified sensitivity information and a set of user-specified permissions.

14. The Al-enabled device according to claim 12, wherein the neural circuitry is further configured to share the user-sensitive information with a plurality of secondary devices connected via a local network, with the Al-enabled device, wherein the user-sensitive information is shared based on authentication of the plurality of secondary devices for the assigned security privilege level on the user-sensitive information.

15. The Al-enabled device according to claim 1, wherein the user consumable information associated with the plurality of intelligent services comprises at least one of audio content, video content, text content, image, graphics, or audio-visual notifications.

16. The Al-enabled device according to claim 1, wherein the maximum dependency on the local sub-cache further minimizes a response time between a request to deliver the user consumable information and a delivery time of the user consumable information at the Al-enabled device.

17. The Al-enabled device according to claim 1, wherein the user consumable information is delivered with a maximum dependency on the local sub-cache and a zero dependency on the supplemental information, in the offline state of the Al-enabled device.

18. The Al-enabled device according to claim 1, wherein the user consumable information is further delivered based on a request received from at least one of the Al-enabled device or the cloud server, and wherein the request is at least one of a user request, a device request, a request initiated by at least one intelligent service of the plurality of intelligent services, or the functional service on the cloud server.

19. A method, comprising:
  in an artificial intelligence (Al)-enabled device that comprises a memory and neural circuitry that handles operations of a plurality of intelligent services on the Al-enabled device:
    storing, by the memory, instructions associated with a plurality of intelligent services that operates in the Al-enabled device, a set of user preferences, network connectivity information of the Al-enabled device, first usage information of the plurality of intelligent services, and second usage information of the Al-enabled device;
    allocating, by the neural circuitry, a dedicated cache storage for the plurality of intelligent services;
    generating, by the neural circuitry, a local Al learning model associated with the Al-enabled device, wherein the local Al learning model is generated based on the set of user preferences, the network connectivity information of the AI-enabled device, and the first usage information of the plurality of intelligent services;

determining, by the neural circuitry, a type of service and first information, wherein
- the type of service is associated with at least one of the plurality of intelligent services,
- the first information is associated with the determined type of service,
- the first information cached at the dedicated cache storage, based on the generated local AI learning model and the second usage information of the AI-enabled device;

caching, by the neural circuitry, the first information associated with the determined type of service, from a cloud server, to a local sub-cache in the dedicated cache storage of the memory, wherein
- the first information of the determined type of service is adaptively cached during at least one of a background activity or a foreground activity of the AI-enabled device, based on an offline state or an online state, specified in the network connectivity information, of the AI-enabled device, and
- the first information is cached based on a mapping of the determined type of service to a corresponding functional service on the cloud server; and controlling, by the neural circuitry, based on a user input, delivery of user consumable information, associated with at least one of the plurality of intelligent services, on the AI-enabled device, based on at least one of the local sub-cache or supplemental information retrievable from the cloud server, wherein the user consumable information is delivered with a maximum dependency on the local sub-cache and a minimum dependency on the supplemental information.

20. The method according to claim 19, further comprising training by the neural circuitry, an adaptive machine learning model on the set of user preferences, the network connectivity information of the AI-enabled device, the first usage information of the plurality of intelligent services, and the second usage information of the AI-enabled device, wherein the local AI learning model is generated further based on the trained adaptive machine learning model.

* * * * *